United States Patent [19]
Busch et al.

[11] Patent Number: 4,549,692
[45] Date of Patent: Oct. 29, 1985

[54] HEATING AND/OR AIR-CONDITIONING INSTALLATION FOR MOTOR VEHICLES

[75] Inventors: Lothar Busch, Gilching; Walter Orth, Munich, both of Fed. Rep. of Germany

[73] Assignee: Bayerische Motoren Werke A.G., Fed. Rep. of Germany

[21] Appl. No.: 524,095

[22] Filed: Aug. 17, 1983

[30] Foreign Application Priority Data

Sep. 4, 1982 [DE] Fed. Rep. of Germany ....... 3232957

[51] Int. Cl.⁴ ............................................. G05D 23/00
[52] U.S. Cl. ................................ 237/12.3 A; 98/2.05; 236/13
[58] Field of Search ...................... 237/12.3 A, 12.3 B; 98/2, 2.05, 2.08; 236/13; 165/42

[56] References Cited

U.S. PATENT DOCUMENTS 4,383,642 5/1983 Sumikawa et al. ............ 237/12.3 A
4,406,214 9/1983 Sakurai ......................... 237/12.3 A Primary Examiner—Henry A. Bennett
Attorney, Agent, or Firm—Craig and Burns

[57] ABSTRACT

A heating and/or air-conditioning system for motor vehicles provide for a temperature stratification between two different partial spaces of the vehicle interior. The system provides for independent reduction of the air stream which can be lowered in its temperature, by control device controlling the temperature of the air stream introduced into a partial space and of a throttle device which may function independently therefrom in a channel through which the air flows to the partial space. The throttle device is arranged downstream of the control device.

10 Claims, 4 Drawing Figures

→ [WARM AIR]
--→ [COLD AIR]

→ [WARM AIR]
--→ [COLD AIR]

HEATING AND/OR AIR-CONDITIONING INSTALLATION FOR MOTOR VEHICLES

The present invention relates to a heating and/or air-conditioning installation for motor vehicles, with at least two air-conduction channels for air flows of the same or different temperature to different partial spaces of the vehicle interior space. The installation includes control devices, by means of which a flow of non-heated air guided past a heat-exchanger and a flow of heated air guided through the heat-exchanger are adapted to be mixed and directed through or prevented from passing through one of the channels.

With such installations, it is desirable to provide a temperature stratification, i.e., a lower temperature in the head space with respect to the leg space. In a known installation of this general type (German Offenlegungsschrift No. 28 36 800), stratification is attained by a two-wing flap which functions as a control device. One wing of the flap is located in the flow of the air guided past the heat-exchanger, i.e., in bypassing relation to the heat-exchanger, and controls the same with regard to quantity. The other wing of the flap is located in the flow of the heated air and enables complete interruption of this flow. The control of the two flows thereby takes place in such a manner that, starting from one position, in which the warm air flow is completely interrupted and the non-heated air has a maximum rate, a warm air flow increasing at the expense of the other flow is adjusted by pivoting the two-wing flap. If the flow of the non-heated air is reduced to zero, then the warm-air flow is also reduced to zero.

The known installation, owing to the necessary structural size of the two-wing flap, is particularly voluminous. There-beyond, it is also extraordinarily unfavorable from a flow point of view since the wing controlling the warm air is disposed perpendicularly in the air stream nearly at all times. Moreover, the channel can be controlled in its through-flow only if warm air is supplied thereto. The case of a through-flow adjustability of the air flow reduced in its temperature with respect to the other space, which is particularly important within the framework of a temperature stratification, cannot be realized in this prior art arrangement.

The present invention is concerned with providing an installation generally of the aforementioned type, in which a quantity control of the air flow introduced into the channel and adjustable in its temperature is achieved at every temperature in a manner favorable from a flow point of view, with a slight constructive expenditure and a small structural volume.

The underlying problems are solved in accordance with the present invention by a throttle device disposed in one channel and a control device for the flow of the non-heated air arranged upstream of the throttle device and which is adjustable independently of the throttle device.

The basic concept of the present invention resides in decoupling the mixing and closing function. It becomes possible thereby to change an air flow which is adjusted at will in its temperature, and also in its quantity, without influence on the adjusted temperature level. The throttle device is constructed, for example, as a simple closure valve and requires, in practice, no structural volume and can be arranged at any desired suitable location. The control device may also be constructed as a simple so-called mixing flap or valve which is also without special space requirement. Such a mixing flap or valve, as in other conventional types of constructions of control devices, can be constructed favorably from a flow point of view in such a manner that at the desired maximum warm-air flow, it does not represent any flow resistance or only a negligibly small flow resistance.

For improving the functioning ability of the installation according to the present invention, provision may additionally be made that the throttle device and control device are adjustable independently of one another only up to a minimum quantity of the air flowing through the channel and that with a further reduction of this air quantity by the throttle device, the control device reduces the cross section of the inlet opening for air heated by the heat-exchanger to the value zero. With a nearly completely closed off channel for the air flow adapted to be lowered in its temperature, and with an adjustment of the control device to a position in which a flow of the non-heated air is made possible, the flow might be mixable with the flow of the heated air and be directed to the open space, in the case indicated hereinabove, the leg space. In order to eliminate this possibility, the positive actuation of the control device is provided in accordance with the present invention.

Two particularly advantageous embodiments of the control device, in accordance with the present invention, provide for the control device being either pivotal between two inlet openings for the non-heated and the heated air flow and for controlling only the air stream of the non-heated air. Whereas the former construction, known in principle from the German Gebrauchsmuster No. 16 96 692, is primarily concerned with an installation controlled on the upstream side, the second embodiment may be used with advantage in connection with installations controlled on the downstream side. In this case, the control device is located in a bypass through which non-heated air can flow.

These and further objects, features and advantages of the present invention will become more apparent from the following description when taken in connection with the accompanying drawing which shows, for purposes of illustration only, several embodiments in accordance with the present invention, and wherein.

Figure 1:
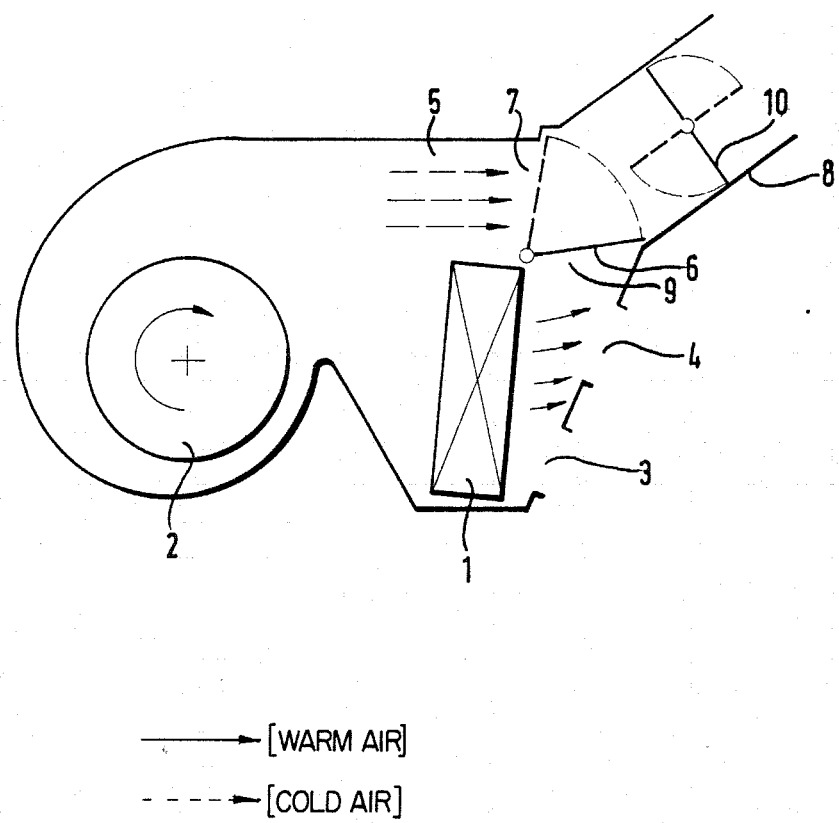
FIG. 1 is a schematic view of a heating installation for motor vehicles with temperature stratification between the head and leg space.

Referring now to the drawings wherein like reference numerals are used throughout the various views to designate like parts, the heating installation schematically illustrated in FIG. 1, includes a water-flow controlled heat-exchanger 1, to which fresh or, respectively, recirculated air is supplied by a blower 2. The heated air which leaves the heat-exchanger 1, flows by way of openings 3 and 4 to the leg space and, respectively, defrosting nozzles (not shown).

A bypass 5 extends in parallel to the heat-exchanger 1, which is controlled by a control device in the form of a pivotal flap or valve 6. In a first position, illustrated in solid line, the pivotal valve 6 opens up an opening 7 of the bypass 5 to a channel 8, at the end of which are located a vent opening and discharge openings for a windshield defrosting system (not shown). In this first position (solid line), the pivotal flap or valve 6 closes an inlet opening 9 which allows warm air to come out of the heat-exchanger 1 into the channel 8. In a second position, illustrated in dash line, the pivotal valve 6 closes the inlet opening 7 and completely opens up the inlet opening 9.

A throttle device in the form of a closure valve 10 is arranged at any desired location inside of the channel 8, which can be actuated independently of the pivotal valve 6. The closure valve 10 can be pivoted between a first position, indicated in dash line, in which it completely opens up the cross section of the channel 8, and a second position, indicated in solid line, in which it completely closes the channel 8.

The temperature of the air stream reaching the channel 8 can be adjusted at will between two extreme values a corresponding adjustment of the pivotal valve 6. The one extreme value is equal to the temperature of the air in the bypass 5 and occurs when the pivotal valve is in the first position i.e., the solid line showing in FIG. 1. The other extreme value is equal to the temperature of the air flowing through the heat-exchanger 1 and occurs when the pivotal flap 6 is in the second position, i.e., the dash line position. The head space of the passenger compartment of the vehicle has the same temperature as the leg space when pivotal flap 6 is in the second position, i.e., the position blocking bypass 5. The temperature of the head space can be varied with respect to that of the leg space, as desired, within the indicated extreme limits, by adjustment to intermediate positions of the pivotal valve 6. The result of the adjustment of the pivotal valve 6 to an intermediate position being that proportional amounts of air heated by the heat exchanger and air bypassing the heat exchanger are mixed as they flow through channel 8.

In addition to this temperature stratification, a control of the quantity of air reaching the head space can be realized with the aid of the closure valve 10. This control can be realized at any desired adjustment of the pivotal valve 6 and without effecting any change of the temperature of the air flowing through the channel 8.

It is contemplated that with adjustments of the closure valve 10, at which only a relatively small air quantity of, for example, 30% of the maximum quantity reaches the head space, that a positive or forcible actuation of the pivotal valve 6 may occur to effect a further closure of the channel 8 i.e., actuation of the closure valve 10 and the pivotal valve 6 may be coordinated. This coaction which is realized, for example, by the use of Bowden cables or by appropriate control circuitry in the case of an actuation of the valves 6 and 10 by motor means, means that with a closure of the closure valve 10 a predetermined amount, the pivotal valve 6 is positively and forcibly displaced into the first position, i.e., the position shown in solid lines. As a result thereof, the inlet opening 9 is closed off and a flow of the non-heated air to the openings 3 and 4 and therewith an undesired temperature decrease of the air stream exiting therethrough is avoided.

Figure 2:
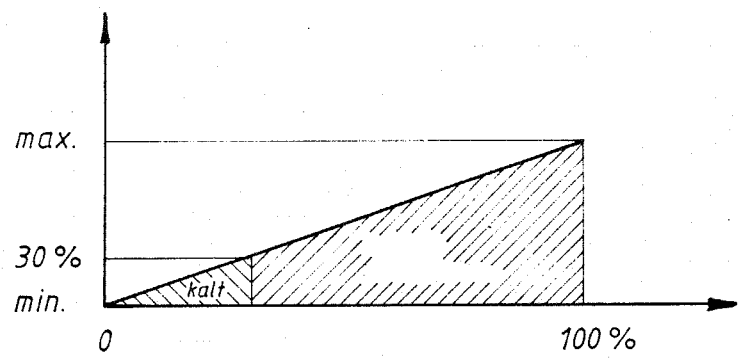
FIG. 2 is a diagram illustrating the adjustment of the air flow conducted to the head space.

The temperature adjustment in the channel 8 with the use of the described positive control of the pivotal valve 6 is illustrated in FIG. 2. Up to the mentioned range of minimum flow in the channel 8, heated and non-heated air flowing through the channel 8 can be controlled temperature-wise by the pivotal valve 6 and quantity-wise by the closure valve 10. Below this minimum quantity, only non-heated air flows in the channel 8, which flow can be reduced continuously to the value zero by the closure valve 10.

Figure 3:
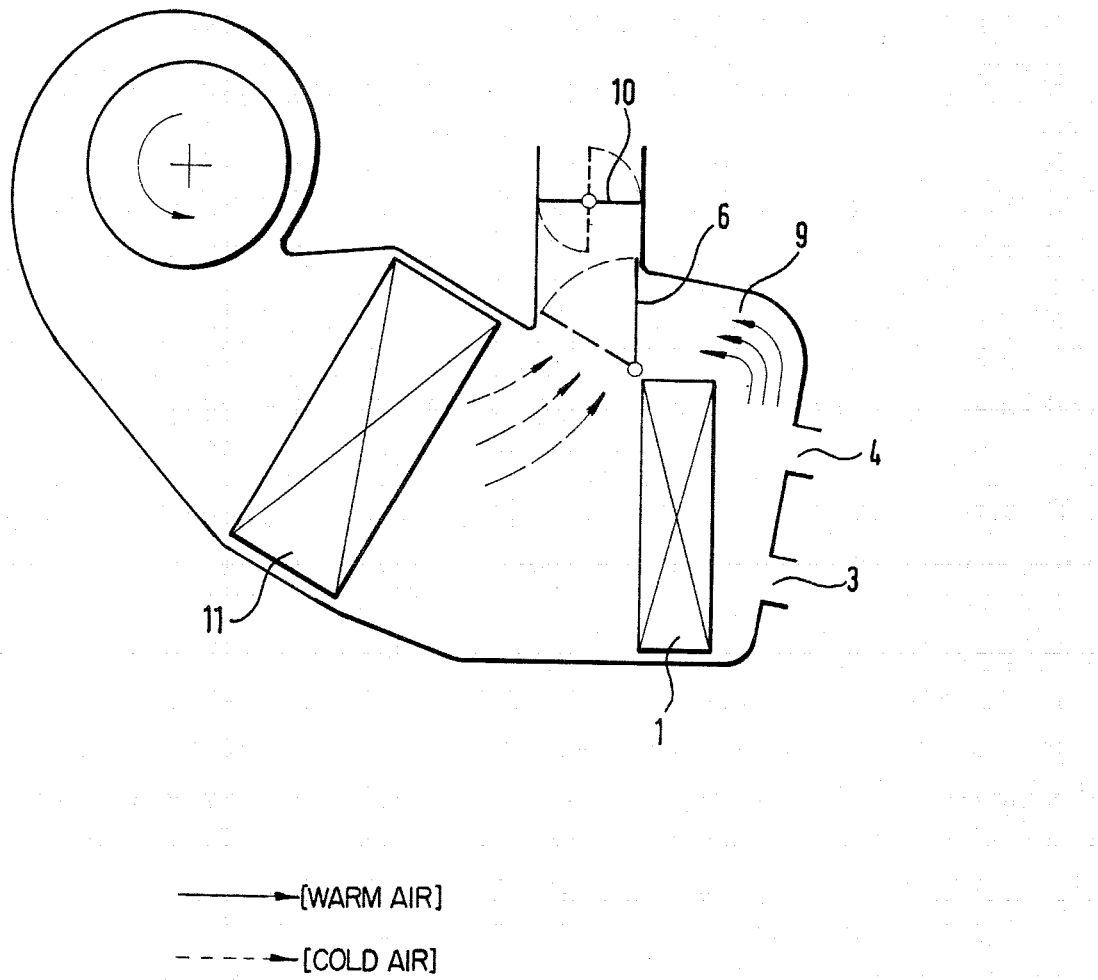
FIG. 3 is a schematic view of a modified embodiment of a heating installation similar to FIG. 1, expanded into an air-conditioning installation.

In the air-conditioning installation of FIG. 3, only the outer shape of the installation is changed because of the installation of an evaporator 11. The remaining parts which are designated by the same reference numerals as in FIG. 1, are identical in their operation.

Figure 4:
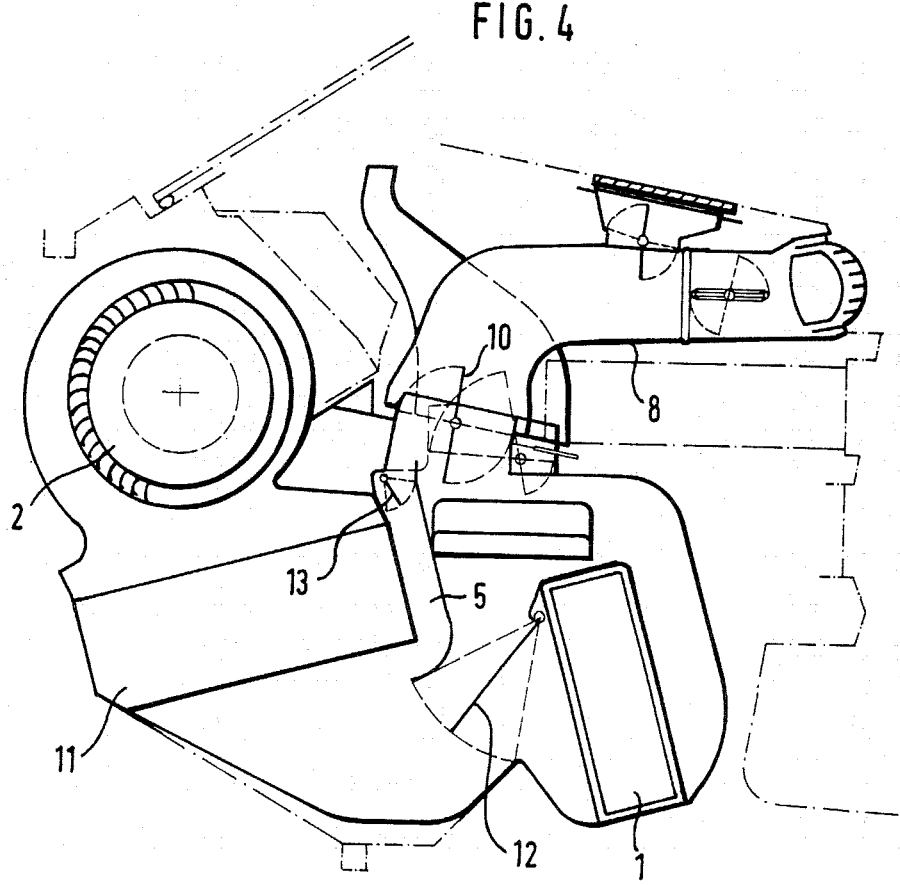
FIG. 4 is a schematic view of a corresponding air-conditioning installation in accordance with the present invention.

Finally, the air-conditioning installation illustrated in FIG. 4 includes an air-mix heat exchanger 17, and in addition to the parts already described and shown in the aforementioned figures, a temperature-mixing valve 12 and a closure valve 13, which functions as a control device, by means of which the bypass 5 can be controlled independently of the adjustment of the closure valve 10. Also in this embodiment, the possibility exists of a positive or forcible control of the closure valve 13 at predetermined positions of the closure valve 10, e.g., when the channel 8 is nearly closed.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air distribution arrangement for providing temperature stratification within the interiors of motor vehicles comprising heat exchanger means for heating air flowing therethrough, bypass means for conducting unheated air past said heat exchanger means, opening means for conducting air flowing through said heat exchanger means to a first predetermined area within the interior of a motor vehicle, channel means for conducting air passing therethrough to a second predetermined area of the interior of said motor vehicle, and further means for selectively mixing unheated air flowing in said bypass means with a flow of air heated by said heat exchanger and for controlling the amount of air passing through said chanel means, said further means including throttle means operable for controlling the amount of air flowing through the channel means and control means for controlling the mixing of unheated air flowing in said bypass means with said flow of air heated by said heat exchanger means, said control means being positionable in intermediate positions between a first extreme position allowing only unheated air to flow to said second predetermined area and a second extreme position allowing only heated air to flow to said second predetermined area, wherein the temperature of air conducted to said second predetermined area is variable independently of the temperature of the air conducted to said first predetermined area.

2. An installation according to claim 1, wherein said throttle means is a closure valve.

3. An installation according to claim 2, wherein said control means is a pivotal valve.

4. An installation according to claim 2, wherein said control means is a closure valve.

5. An installation according to claim 1, wherein the throttle means and the control means are adjustable independently of one another only up to a minimum quantity of the air flowing through said channel means, and with a further reduction of this air quantity by the throttle means, the control means reduces the cross section of an inlet opening for the air heated through the heat-exchanger to substantially preclude the heated air from passing therethrough.

6. An installation according to claim 5, wherein the control means is pivotal between two inlet openings for the unheated and the heated air flow.

7. An installation according to claim 5, wherein the control means is exposed only to the flow of the unheated air.

8. An installation according to claim 1, wherein the control means is pivotal between two inlet openings for the unheated and the heated air flow.

9. An installation according to claim 1, wherein the control means is exposed only to the flow of the unheated air.

10. An air distribution arrangement for providing temperature stratification within the interiors of motor vehicles comprising heat exchanger means for heating air flowing therethrough, bypass means for conducting unheated air past said heat exchanger means, opening means for conducting air flowing through said heat exchanger means to a first predetermined area within the interior of a motor vehicle, channel means for conducting air passing therethrough to a second predetermined area of the interior of said motor vehicle, and further means for selectively mixing unheated air flowing in said bypass means with a flow of air heated by said heated exchanger and for controlling the amount of air passing through said channel means, said further means including throttle means operable for controlling the amount of air flowing through the channel means and control means disposed upstream of said throttle means for controlling the mixing of unheated air flowing in said bypass means with said flow of air heated by said heat exchanger means, said control means being independently adjustable relative to said throttle means and being positionable in intermediate positions between a first extreme position allowing only unheated air to flow to said second predetermined area and a second extreme position allowing only heated air to flow to said second predetermined area, wherein the temperature of air conducted to said second predetermined area is variable independently of the temperature of the air conducted to said first predetermined area.

* * * * *